United States Patent [19]

Tanahashi

[11] Patent Number: 4,486,028

[45] Date of Patent: Dec. 4, 1984

[54] UPPER SUPPORT STRUCTURE FOR FRONT WHEEL SUSPENSION OF AUTOMOBILE

[75] Inventor: Haruhiko Tanahashi, Toyota, Japan

[73] Assignee: Toyota Jidosha Kabushiki Kaisha, Toyota, Japan

[21] Appl. No.: 452,133

[22] Filed: Dec. 22, 1982

[51] Int. Cl.³ .............................................. B60G 7/02
[52] U.S. Cl. ................................ 280/668; 267/20 A; 280/670; 280/672
[58] Field of Search ............... 280/666, 667, 668, 670, 280/673; 267/20 R, 20 A

[56] References Cited

U.S. PATENT DOCUMENTS 3,940,160 2/1976 Damon ................................. 280/670

FOREIGN PATENT DOCUMENTS 140607 11/1980 Japan .................................. 280/668

*Primary Examiner*—Joseph F. Peters, Jr.
*Assistant Examiner*—Kenneth R. Rice

*Attorney, Agent, or Firm*—Oblon, Fisher, Spivak, McClelland & Maier

[57] ABSTRACT

A front wheel support structure for an automobile comprises a first support fixed to a body, a second support disposed beneath and spaced at the inner portion thereof from the first support, contacting a bound stopper at the underside of the inner peripheral portion and secured fixedly to the first support at the outer peripheral portion, a mount rubber disposed between both supports, a connecting member secured fixedly to the mount rubber and mounted on the upper portion of a piston rod of a shock absorber and a bearing seat disposed at the underside of the second support and contacting a spring seat for receiving the upper end of a coil spring. In use of the support structure, force from the piston rod is transmitted from the mount rubber through the first support to the body, force from the bound stopper is transmitted from the second support through the first support to the body and force from the coil spring is transmitted from the spring seat to the bearing seat and further through the second and first supports to the body respectively.

7 Claims, 1 Drawing Figure

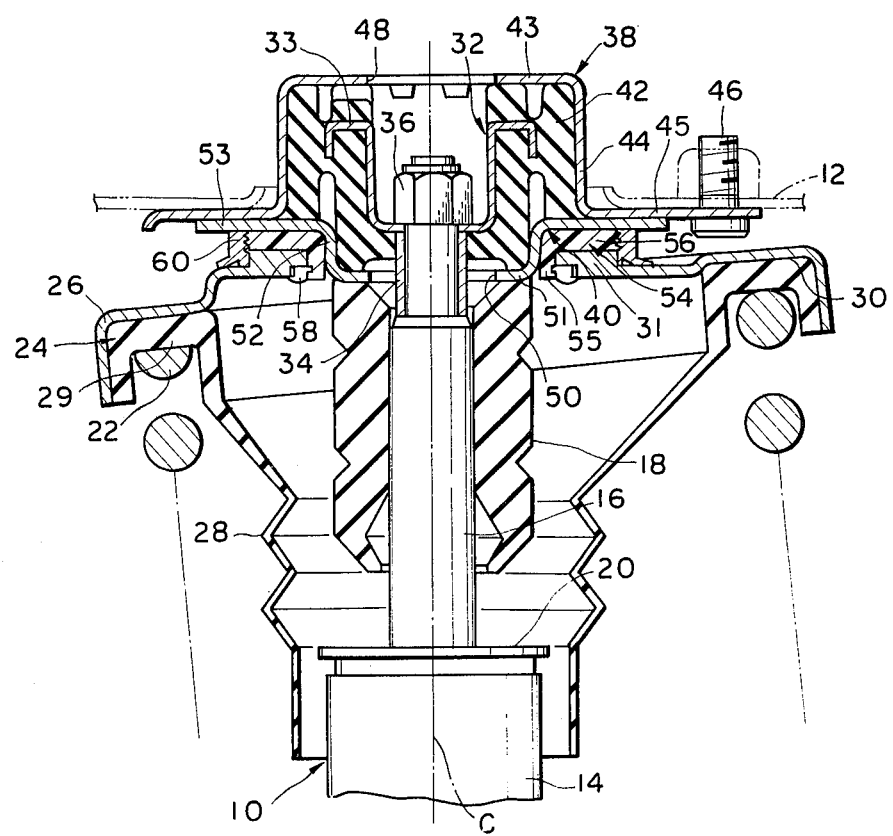

UPPER SUPPORT STRUCTURE FOR FRONT WHEEL SUSPENSION OF AUTOMOBILE

BACKGROUND OF THE INVENTION

1. Field of the Invention:

This invention relates to a front wheel suspension for an automobile and more particularly to an upper support structure for a Macpherson strut type front wheel suspension.

2. Description of the Prior Art:

Generally, the upper support structure of the suspension is constructed to transmit forces from a shock absorber, a bound stopper and a coil spring all together to a body of an automobile through a single rubber mount. The force from the shock absorber among said forces is relatively small while the forces from the bound stopper and coil spring are relatively large.

In order, to provide a good ride, the softer the rubber mount is, the more preferable it is. However, as mentioned above, since all forces are transmitted to the body through the single rubber mount, it is inevitable to employ a hard rubber mount capable of resisting a large force, so that the provision for a good ride has a limit.

Also, upper support structure utilized in the prior art realized rotational operation in steering of the shock absorber and coil spring relative to the body by the use of expensive ball bearings or the like.

SUMMARY OF THE INVENTION

Accordingly, an object of the present invention is to provide an upper support structure which transmits individually said respective forces to the body and interposes a plastic bearing sheet between the body and the coil spring.

The present invention provides an upper support structure for a front wheel suspension of an automobile which transmits forces from the road to a body of the automobile through a piston rod of a shock absorber, a bound stopper disposed to surround the piston rod, and a coil spring disposed to surround said shock absorber and having an upper end held by a spring seat, said upper support structure comprising an integral first support having a first flange provided in the center with a hole through which a tool can be inserted and a second flange fixed to said body, a second support having a first flange contacting the upper end of said bound stopper, provided in the center with a hole through which the upper end portion of said piston rod extends and spaced from said first flange of said first support axially of said piston rod and a second flange contacting said second flange of said first support, a rubber mount disposed between and secured fixedly to said first and second supports, a connecting member secured fixedly to the rubber mount and mounted on the upper end portion of said piston rod, and a plastic bearing sheet disposed at the underside of said second flange of said second support and contacting said spring seat.

These and other objects and features of this invention will be apparent from the following detailed description of embodiments with reference to the drawing.

BRIEF DESCRIPTION OF THE DRAWING

The sole FIGURE is a sectional view showing principal portions of an upper support structure for a front wheel suspension of an automobile according to the present invention.

DESCRIPTION OF THE PREFERRED EMBODIMENT

An upper support structure according to the present invention, as shown in the sole FIGURE, is one which supports the upper portion of a front wheel suspension having a shock absorber 10 on a body 12 of an automobile.

The shock absorber 10 itself is well known which is provided with a cylinder 14 and a piston rod 16 connected on the lower end to a piston (not shown) slidably disposed in the cylinder 14.

A bound stopper 18 is disposed to surround the outer periphery of the piston rod 16. This bound stopper 18 holds a stopper plate 20 provided on the upper end of the cylinder 14 to suppress exceeding of a predetermined limit when the cylinder 14 and piston rod 16 are relatively displaced in the direction of contracting the piston rod 16 by bounded wheels. The bound stopper 18 is generally formed of rubber.

A coil spring 22 is disposed to surround said shock absorber 10. The lower end of this coil spring 22 is held by a spring carrier (not shown) provided in said cylinder 14, and the upper end of the coil spring 22 is held by a spring seat 26 through an insulator 24.

In the embodiment shown, the insulator 24 is integrally provided with a dust cover 28 which surrounds said bound stopper 18 and the upper end portion of the cylinder 14. This integral structure provides satisfactory operability when the insulator and dust cover are incorporated. The insulator 24 has a groove portion 29 which receives the upper end of said coil spring 22 and fits in a carrier portion 30 provided on the outer periphery of the spring seat 26.

On the upper end of said piston rod 16 is mounted a connecting member 32 which has on the lower end a cylindrical spacer 34. This spacer 34 fits on the upper end portion of the piston rod 16 to be fixed to the piston rod by a nut 36 which is threaded on a screw provided on the piston rod 16. The connecting member 32 is secured fixedly to a mount rubber 42 disposed between a first support 38 and a second support 40 which will be described later.

The first support 38 has a first flange 43 disposed substantially orthogonally to the axis C of the piston rod 16, a tubular portion 44 extending substantially along said axis C from the outer periphery of the first flange 43 and a second flange 45 extending outward from the tubular portion 44 substantially orthogonally to said axis C. The second flange 45 is fixed to said body 12 by bolts and nuts 46. Said first flange 43 is provided in the center with an opening 48 through which a tool such as socket wrench is inserted to screw said nut 36 onto the upper end of the piston rod 16.

The second support 40 has a first flange 51 disposed substantially orthogonally to said axis C and provided in the center with an opening 50 through which the upper end portion of said piston rod 16 extends, a tubular portion 52 extending substantially along said axis C from the outer periphery of the first flange 51 and a second flange 53 of second support 40 extending outward from the tubular portion 52 substantially orthogonally to said axis C. The upper end of the bound stopper 18 contacts the first flange 51, and the second flange 53 contacts the second flange 45 of the first support 38. In this case, to prevent their relative movement, both flanges 45, 53 are preferably fixed to each other by welding such as spot welding or bolts and nuts. Further the rubber mount 42 may be secured fixedly to the first and second supports 38, 40, respectively, by utilizing adhesion produced in molding and vulcanizing of the rubber mount which will be described later, so that relative movement between the first support 38 and second support 40 is prevented.

To receive a force from the piston rod 16, the connecting member 32 is fixedly secured to the rubber mount 42 while the rubber mount 42 is fixedly secured to the first and second supports 38, 40. Generally, said fixation is accomplished directly by molding and vulcanizing of the mount rubber 42. Since an axial force together with a lateral force act on the piston rod 16 to prevent the connecting member 32 from being separated from the mount rubber 42, the connecting member 32 is preferably provided with an engaging portion 33 having an L-shaped section and embedded in the rubber mount 42.

A plastic bearing seat 54 is disposed around the outer periphery of the tubular portion 52 of the second support 40. This bearing seat 54 is interposed between said second flange 53 of said second support 40 and said spring seat 26 to permit the spring seat 26 to rotate freely relative to the second flange 53. The bearing seat 54 is molded of hard plastic having a low coefficient of friction, for example polyacetal or nylon. In the embodiment shown, the bearing seat 54 has a tubular portion 55 contacting only the outer periphery of the tubular portion 52 and a flange 56 contacting the second flange 53. This construction is preferable since the bearing seat 54 in use can be prevented from being deviated by the force of the coil spring. A stepwise-formed inner peripheral edge portion 31 of the spring seat 26 is sealed by seal members 58, 60 attached respectively to the tubular portion 55 and flange 56 of the bearing seat 54. Since sliding surfaces between the spring seat 26 and the bearing seat 54 can be prevented from being penetrated by sand or the like by such construction, durability of the bearing seat will be preferably improved.

The force transmitted from road to the piston rod 16 in use reaches the mount rubber 42 through the connecting member 34 and further is transmitted through the second flange 45 of the first support 38 to the body 12. Next, the force transmitted from the road to the bound stopper 18 reaches the first flange 51 of the second support 40, passes through the second support 40 and the second flange 45 of the first support 38 and is transmitted to the body 12. The force transmitted from the road to the spring 22 reaches the bearing seat 54 through the spring seat 26 and is transmitted through the second flange 53 of the second support 40 and the second flange 45 of the first support 38 to the body 12. Also, rotation of the shock absorber 10 in steering is realized by sliding rotation of the spring seat 26 relative to the bearing seat 54 and by sliding rotation of the cylinder 14 relative to the piston rod 16 known per se.

According to this invention, since the paths of forces transmitted from the road through the piston rod, bound stopper and coil spring to the body respectively are independent of each other, soft rubber can be employed for the rubber mount. As a result, a substantially improved ride on a good road is provided. Also, the cost of production can be reduced since the spring seat is subjected to sliding rotation by the plastic bearing seat 54 in steering.

What is claimed is:

1. An upper support structure for a front wheel suspension of an automobile which transmits forces from a road to a body of the automobile through a piston rod of a shock absorber, a bound stopper disposed to surround the piston rod and a coil spring disposed to surround said shock absorber and which is received on an upper end thereof by a spring seat, comprising:
   a first support integrally including a first flange provided in a center portion thereof with an opening through which a tool can be inserted and a second flange fixed to said body;
   a second support having a first flange directly contacting an upper end portion of said bound stopper and provided in a center portion thereof with an opening through which an upper end portion of said piston rod extends and which is spaced from said first flange of said first support axially of said piston rod,
   a second flange contacting said second flange of said first support and a tubular portion extending from said first flange of said second support axially of said piston rod to said second flange of said second support and through which a force is transmitted from said bound stopper to said body of the automobile;
   a rubber mount disposed between and fixedly secured to said first support and said second support;
   a connecting member fixedly secured to the rubber mount and which is mounted to the upper end of said piston rod and through which the force from said piston rod to said body is transmitted; and
   a plastic bearing seat disposed at an underside portion of said second flange of said second support and having a tubular portion contacting said tubular portion of said second support, said plastic bearing seat contacting said spring seat and through which the force is transmitted from said coil spring to said body.

2. An upper support structure as claimed in claim 1 wherein said second flange of said second support is fixedly secured to said second flange of said first support.

3. An upper support structure as claimed in claim 1 further comprising an insulator integrally including a dust cover interposed between said spring seat and said coil spring.

4. An upper support structure as claimed in claim 1 further comprising a plurality of sealing members wherein said spring seat has an inner peripheral edge portion formed stepwise and wherein sliding surfaces between the inner peripheral edge portion and said plastic bearing seat are sealed by said sealing members.

5. An upper support structure as claimed in claim 1, wherein said tubular portion of said plastic bearing seat contacts only an outer peripheral portion of said second tubular portion of said second support member.

6. An upper support structure for a front wheel suspension of an automobile which transmits forces from a road to a body of the automobile through a piston rod of a shock absorber, a bound stopper disposed to surround the piston rod and a coil spring disposed to surround said shock absorber and having an upper end received by a spring seat through an insulator, comprising:
   a first support integrally including a first flange provided in a center portion thereof with an opening through which a tool can be inserted and disposed orthogonally to the axis of said piston rod;
   a first tubular portion extending along said axis from the outer periphery of the first flange and a second flange extending outward from the lower end of the tubular portion orthogonally to said axis and fixed to said body;

a second support integrally including a first flange directly contacting the upper end of said bound stopper, provided in a center portion with an opening through which the upper end portion of said piston rod extends and which is disposed orthogonally to said axis;

a second tubular portion extending along said axis from the outer periphery of the first flange of said second support and a second flange of said second support extending outward from the upper end of the second tubular portion orthogonally to said axis and through which a force is transmitted from said bound stopper to said body of the automobile, said second tubular portion being fixedly secured to said second flange of said first support;

a rubber mount disposed between and fixedly secured to said first support and said second support;

a connecting member fixedly secured to the rubber mount and mounted on the upper end of said piston rod; and a plastic bearing seat having a tubular portion contacting said second tubular portion of said second support, disposed at the underside of said second flange of said second support, contacting said spring seat and through which the force is transmitted from said coil spring to said body.

7. An upper support structure as claimed in claim 6, wherein said tubular portion of said plastic bearing seat contacts only an outer peripheral portion of said second tubular portion of said second support member.

* * * * *